(12) United States Patent
Thorson et al.

(10) Patent No.: US 7,075,885 B2
(45) Date of Patent: Jul. 11, 2006

(54) METHOD FOR ASSIGNING VARIABLE-LENGTH WALSH CODES FOR CODE DIVISION MULTIPLE ACCESS COMMUNICATIONS SYSTEMS

(75) Inventors: Dean E. Thorson, Grayslake, IL (US); Daniel J. Declerck, Lake Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 910 days.

(21) Appl. No.: 10/005,542

(22) Filed: Dec. 3, 2001

(65) Prior Publication Data
US 2003/0103447 A1 Jun. 5, 2003

(51) Int. Cl.
*H04J 11/00* (2006.01)
(52) U.S. Cl. ............ 370/209; 370/208; 370/320; 370/335; 370/342
(58) Field of Classification Search ........... 370/320, 370/335, 342, 208, 209
See application file for complete search history.

(56) References Cited
U.S. PATENT DOCUMENTS

| 5,353,352 | A | * | 10/1994 | Dent et al. ............ 380/37 |
| 5,751,761 | A | * | 5/1998 | Gilhousen ............ 375/146 |
| 6,163,524 | A | | 12/2000 | Magnusson et al. |
| 6,526,091 | B1 | * | 2/2003 | Nystrom et al. ......... 375/142 |
| 6,724,738 | B1 | * | 4/2004 | Storm et al. ............ 370/320 |
| 2001/0046205 | A1 | * | 11/2001 | Easton et al. ............ 370/209 |
| 2002/0146059 | A1 | * | 10/2002 | Kodani et al. ............ 375/130 |

FOREIGN PATENT DOCUMENTS

| EP | 0 994 593 A1 | 4/2000 |
| WO | WO 95/03652 | 2/1995 |

* cited by examiner

*Primary Examiner*—Ricky Q. Ngo
*Assistant Examiner*—Jonathan Liou
(74) *Attorney, Agent, or Firm*—Simon B. Anolick (57) ABSTRACT

Modulation codes for code division multiple access (CDMA) cellular communications systems that are mutually orthogonal may be generated as a sequence of Walsh codes. A method of assigning Walsh codes includes the steps of (404) receiving as input a status vector (200) for a Walsh code system of length $2^n$ and a selected Walsh code length $j=2^{n-k}$; (406)–(418) creating a new status vector for a selected Walsh code length of j from the status vector; (416) creating a search mask for the selected Walsh code length j; (418) creating a search sequence for the selected Walsh code length j; and (434)–(442) searching the search sequence for the next available Walsh code. The status vector is updated (500) to track the assignment and release of each Walsh code of each Walsh code length in the Walsh code system.

14 Claims, 5 Drawing Sheets

| WALSH CODE LENGTH | R | E | S | E | R | V | E | D | | | | | | | | |
|---|---|---|---|---|---|---|---|---|---|---|---|---|---|---|---|---|
| 1 | 0 | | | | | | | | | | | | | | | |
| 2 | 0 | | | | | | | 1 | | | | | | | | |
| 4 | 0 | | | | 2 | | | 1 | | | | 3 | | | | |
| 8 | 0 | | 4 | | 2 | | 6 | 1 | | 5 | | 3 | | 7 | | |
| 16 | 0 | 8 | 4 | 12 | 2 | 10 | 6 | 14 | 1 | 9 | 5 | 13 | 3 | 11 | 7 | 15 |

FIG. 1 100

| WC | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| S | 1 | 0 | 0 | 0 | 1 | 0 | 0 | 0 | 1 | 0 | 0 | 0 | 1 | 0 | 0 | 0 |

200 FIG. 2

| CODE LENGTH | BIT MASK |
|---|---|
| 16 | 0x0001 |
| 8 | 0x0101 |
| 4 | 0x1111 |
| 2 | 0x5555 |
| 1 | 0xFFFF |

METHOD FOR ASSIGNING VARIABLE-LENGTH WALSH CODES FOR CODE DIVISION MULTIPLE ACCESS COMMUNICATIONS SYSTEMS

BACKGROUND OF THE INVENTION

The present invention relates generally to code division multiple access (CDMA) cellular communications systems. More specifically, but without limitation thereto, the present invention relates to assigning Walsh codes to service a maximum number of users in a code division multiple access service area having varying data rates.

In third generation code division multiple access cellular communications systems, one of the mechanisms used to provide variable-rate data transmission is to use different length Walsh-Hadamard codes (hereafter referred to as Walsh codes) for modulation on forward link communications signals. Walsh codes of the same length are orthogonal to one another, and may therefore be used in the same frequency band by different users without interfering with one another. Users having slower data rates are assigned longer Walsh codes, while users having faster data rates are assigned shorter Walsh codes.

A problem arises in assigning combinations of different length Walsh codes, because the shorter Walsh codes "cover" certain longer Walsh codes, i.e., longer Walsh codes generated from shorter Walsh codes are not orthogonal to the shorter Walsh codes. Mutual interference could result if shorter Walsh codes were assigned at the same time as longer Walsh codes that include the shorter Walsh codes. To service the maximum number of users having different data rates, each Walsh code assigned from the Walsh code space preferably excludes from use the minimum number of shorter Walsh codes. Current methods for searching for the next available Walsh code are time consuming and do not necessarily exclude the minimum number of shorter Walsh codes.

BRIEF DESCRIPTION OF THE DRAWINGS

The features and advantages of the present invention may be apprehended from the following description thereof, presented in conjunction with the following drawings wherein.

Corresponding reference characters indicate corresponding elements throughout the several views of the drawings.

DETAILED DESCRIPTION OF THE DRAWINGS

The following description is presented to disclose the currently known best mode for making and using the present invention. The scope of the invention is defined by the claims.

Modulation codes for code division multiple access (CDMA) cellular communications systems that are mutually orthogonal may be generated as a sequence of Walsh codes. For example, to generate a Walsh code sequence of length two starting from a seed value of zero for a Walsh code of length one, the seed value of zero is appended to itself to generate the first Walsh code, "00". The bit-inverse of the seed value is appended to the seed value to generate the second Walsh code, "01". This is the equivalent of creating the 2-bit Walsh code table shown in Table 1 below.

TABLE 1

| Walsh Code | W0 | W1 |
|---|---|---|
| 0 | 0 | 0 |
| 1 | 0 | 1 |

The procedure used to create Table 1 may be repeated to generate the Walsh codes for the next higher order, i.e., the next longer Walsh code length, as shown in Table 2. The 2×2 matrix in bit positions W0 and W1, also called the Hadamard transform matrix, is appended to itself in bit positions W2 and W3 to generate the first two Walsh codes 0 and 1. The second two Walsh codes 2 and 3 are generated by appending the bit-inverse of the 2×2 matrix to the original 2×2 matrix.

TABLE 2

| Walsh Code | W0 | W1 | W2 | W3 |
|---|---|---|---|---|
| 0 | 0 | 0 | 0 | 0 |
| 1 | 0 | 1 | 0 | 1 |
| 2 | 0 | 0 | 1 | 1 |
| 3 | 0 | 1 | 1 | 0 |

In Table 2, Walsh codes 0 and 2 have the same first two bits in bit positions W0 and W1, while the last two bits in bit positions W2 and W3 are inverses of each other. The same relationship exists for Walsh codes 1 and 3.

Additional Walsh code tables for the higher order Walsh code lengths may be generated by repeating the procedure above. For example, to create eight-bit Walsh codes, the 4×4 matrix of Table 2 is replicated three times and inverted in the lower right hand quadrant as shown in Table 3 below.

TABLE 3

| Walsh Code | W0 | W1 | W2 | W3 | W4 | W5 | W6 | W7 |
|---|---|---|---|---|---|---|---|---|
| 0 | 0 | 0 | 0 | 0 | 0 | 0 | 0 | 0 |
| 1 | 0 | 1 | 0 | 1 | 0 | 1 | 0 | 1 |
| 2 | 0 | 0 | 1 | 1 | 0 | 0 | 1 | 1 |
| 3 | 0 | 1 | 1 | 0 | 0 | 1 | 1 | 0 |
| 4 | 0 | 0 | 0 | 0 | 1 | 1 | 1 | 1 |
| 5 | 0 | 1 | 0 | 1 | 1 | 0 | 1 | 0 |
| 6 | 0 | 0 | 1 | 1 | 1 | 1 | 0 | 0 |
| 7 | 0 | 1 | 1 | 0 | 1 | 0 | 0 | 1 |

In each of the Walsh code tables of order n bits, where n is a power of 2, the first half of each $k^{th}$ row is identical to the first half of each $(k+n/2)^{th}$ row, while the second half of each $k^{th}$ row contains the inverse of the second half of each $(k+n/2)^{th}$ row. For example, in Table 3, n=8. For k=0, rows 0&4 are identical in bit positions W0 through W3 and the bit-inverse of each other in bit positions W4 through W7. Similarly, rows 1&5, 2&6, and 3&7 share the same relationship for k=1, 2, and 3, respectively.

A unique relationship may also be demonstrated between shorter and longer Walsh codes. The 4-bit Walsh codes in Table 2 each "cover" two 8-bit Walsh codes, i.e., the 4-bit Walsh code "0" is the same as the first half of the 8-bit Walsh codes "0" and "4". If the 4-bit Walsh code "0" were assigned to one user and either of the 8-bit Walsh codes "0" or "4" were assigned to another user, then the 4-bit Walsh code and the 8-bit Walsh could interfere with each another. Longer Walsh codes are thus made unavailable, or "covered" by the assignment of shorter Walsh codes. The repetition of the shorter Walsh code k of length n/2 in the first half of each of the Walsh codes k and (k+n/2) of length n may be used to generate a coverage sequence table for a Walsh code system to predict the Walsh codes covered by the assignment of any Walsh code in the system. For example, using the coverage rule that a Walsh code k of order n/2 covers Walsh codes k and (k+n/2) of the next higher Walsh code of length n, the 2-bit Walsh code "0" covers the 4-bit Walsh code pair (0,2), and the 2-bit Walsh code "1" covers the 4-bit Walsh code pair (1,3). Similarly, the four 4-bit Walsh codes "0", "2", "1", and "3" in the same sequential order calculated immediately above cover the 8-bit Walsh code pairs (0,4), (2,6), (1,5), and (3,7), respectively. The same calculation may be repeated to construct a coverage sequence table for a Walsh code system up to any desired Walsh code length.

Figure 1:
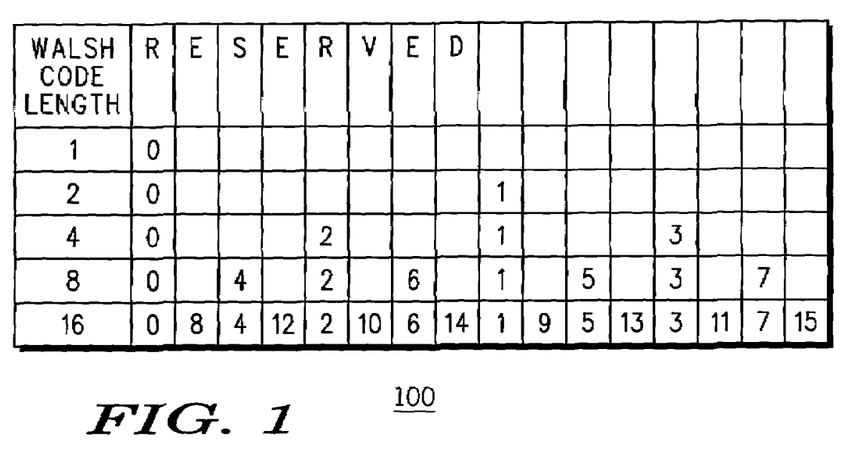
FIG. 1 is a coverage sequence table for a 16-bit Walsh code system according to an embodiment of the present invention.

FIG. 1 is a coverage sequence table 100 for a 16-bit Walsh code system generated by the coverage rule defined above, i.e., each Walsh code k in the preceding row for Walsh code length (n/2) covers Walsh codes k and (k+n/2) in the next row for the Walsh code length n, where k represents a Walsh code and n is a positive integer power of 2. The first row of the coverage sequence table 100 contains the Walsh code "0" of length one. The symbols "0" etc. used to represent Walsh codes may be substituted by other symbols to suit specific applications. In certain systems, the use of the Walsh code "0" is used for a pilot symbol. In the 16-bit Walsh code of FIG. 1, for example, the use of Walsh code "0" as a pilot symbol would exclude all uses of shorter length Walsh codes of "0". The columns under the heading "RESERVED" would therefore be covered by the pilot symbol. On the other hand, if 16-bit Walsh code "13" were assigned, the assignment of 8-bit Walsh code "5", the 4-bit Walsh code "1", and the 2-bit Walsh code "1" would be excluded.

The coverage sequence table 100 may be used to search for available Walsh codes by comparing bit masks and a bit-mapped status vector of the Walsh code system. For example, if a 16-bit Walsh code system is used, a 16-bit Walsh code status vector may be used to track the status of the existing Walsh code assignments.

Figure 2:
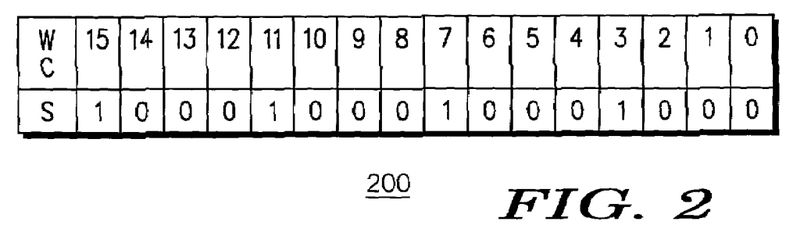
FIG. 2 is a status vector for the 16-bit Walsh code system mapped by the coverage sequence of FIG. 1.

FIG. 2 is a status vector 200 for the 16-bit Walsh code system mapped by the coverage sequence table 100 of FIG. 1. Each 16-bit Walsh code k (WC) indicated in the top row of the status word has an availability status (S) indicated in the bottom row by a "1" if the Walsh code is already assigned and by a "0" if the Walsh code is not already assigned. For example, if the 4-bit Walsh code "3" is assigned, the coverage sequence table 100 shows that the 8-bit Walsh codes "3" and "7" are covered. The 8-bit Walsh code "3" covers the 16-bit Walsh codes "3" and "11", and the 8-bit Walsh code "7" covers the 16-bit Walsh codes "7" and "15". The four 16-bit Walsh codes "3", "11", "7", and "15" are thus covered by the assignment of the 4-bit Walsh code "3" according to the coverage sequence table 100. The covered Walsh codes "3", "11", "7", and "15" are shown as "1"s in the example illustrated for the status vector 200.

To search the status vector 200 for available 4-bit Walsh codes from left to right in the coverage sequence table 100, the combinations of bit locations to search in the status vector 200 are given in hexadecimal as 0x1111 for the 4-bit Walsh code "0", 0x4444 for the 4-bit Walsh code "2", 0x2222 for the 4-bit Walsh code "1", and 0x8888 for the 4-bit Walsh code "3". This search sequence guarantees minimum distance from Walsh code "0", i.e., the search will find the first available Walsh code that is furthest to the left in the coverage sequence table 100, however other search sequences may be used to suit specific applications. The various combinations of bit locations for each Walsh code length 200 may be readily searched in the status vector using bit masks.

Figure 3:
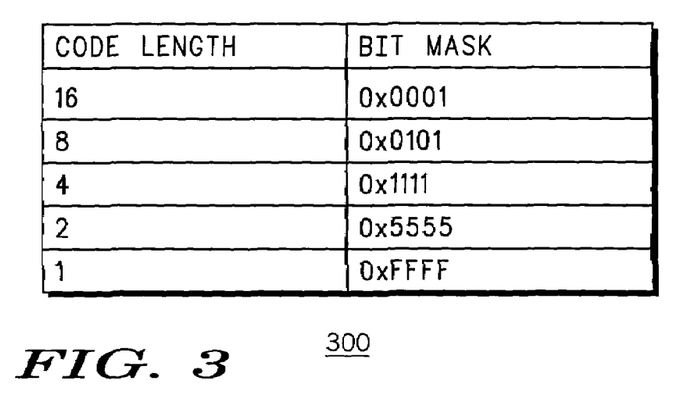
FIG. 3 is a table of bit masks for the 16-bit Walsh code system mapped by the coverage sequence of FIG. 1.

FIG. 3 is a table 300 of bit masks for the 16-bit Walsh code system mapped by the coverage sequence table 100 of FIG. 1. The bit mask for a 1-bit Walsh code is all "1"s. The bit mask for a 2-bit Walsh code is a repeating sequence of "01" or 0x5555; for a 4-bit Walsh code, a repeating sequence of "0001" or 0x1111; for an 8-bit Walsh code, a repeating sequence of "00000001" or 0x0101. The bit mask table 300 may be extended to include the bit mask for any Walsh code length n by repeating a sequence of n−1 zeroes followed by a one.

A specific bit mask for each Walsh code at the selected Walsh code length may be generated by shifting the general Walsh code given in the bit mask table 300. The general bit mask corresponds to the Walsh code furthest to the left in the coverage sequence table 100, to the Walsh code referred to as "0". The bit mask corresponding to each Walsh code in the coverage sequence table 100 is given by shifting the general bit mask left by the number of bits specified by the Walsh number M. For example, to generate the bit mask for the 16-bit Walsh code 7 in the coverage sequence table 100, the general 16-bit bit mask given in FIG. 3 of 0x0001 is shifted left by M=7 bits, resulting in the bit mask 0x0080.

The bit masks for each corresponding Walsh code k of length n may be stored in a lookup table and retrieved by, for example, a computer using k and n as the address of each bit mask [k,n] in the lookup table according to well known techniques. Alternatively, the general bit masks may be stored in a lookup table, and a shift index for each bit mask for each Walsh code may be stored and retrieved for shifting the general bit mask as explained above to generate each of the other bit masks of Walsh code length n.

In the example described above, the 4-bit Walsh code "3" has a corresponding bit mask [3,4] of 0x8888. To check whether the 4-bit Walsh code "3" is available, the bit mask [3,4] of 0x8888 is AND'ed with the status vector 200. If the result of the AND operation is equal to the bit mask [3,4], then the corresponding Walsh code "3" is not available. In this example, the result 0x8888 is equal to the bit mask [3,4], therefore neither of the two 8-bit Walsh codes below and to the right of the 4-bit Walsh code "3" in the coverage sequence table 100 is available.

If the result of the AND operation is equal to 0x0000, then both of the 8-bit Walsh codes "3" and "7" below the 4-bit Walsh code "3" in the coverage sequence table 100 are available. If the result of the AND operation is not equal to either 0x0000 or the bit mask [3,4] of 0x8888, then at least one of the 16-bit Walsh codes "3", "7", "11", and "15" below the 4-bit Walsh code "3" in the coverage sequence table 100 is available. In the example above, the result of the AND operation for the 4-bit Walsh code "3" is equal to the bit mask [3,4], therefore neither of the 8-bit Walsh codes "3" or "7" is available.

After determining that the 4-bit Walsh code "3" is not available, the next Walsh code "1" in the coverage sequence table 100 is searched in the status vector 200. Using the bit mask [1,4] of 0x2222 corresponding to the 4-bit Walsh code "1", the result of the AND operation is 0x0000, indicating that the 4-bit Walsh code "1", both of the 8-bit Walsh codes "1" and "5", and the four 16-bit Walsh codes "1", "9", "5", and "13" are all available.

A method of assigning Walsh codes is described below that includes the steps of receiving as input a status vector for a Walsh code system of length $2^n$; creating a new status vector for a selected Walsh code length of $j=2^{n-k}$ from the status vector; creating a search mask for the selected Walsh code length of j; creating a search sequence for the selected Walsh code length of j; and searching the search sequence with the search mask to find the next available Walsh code.

In the following figures, the uppercase letters "J", "K", "M", and "N" are equivalent to the lowercase letters "j", "k", "m", and "n" respectively in the description and claims. Italics are used only to distinguish these parameters from the text.

Figure 4A:
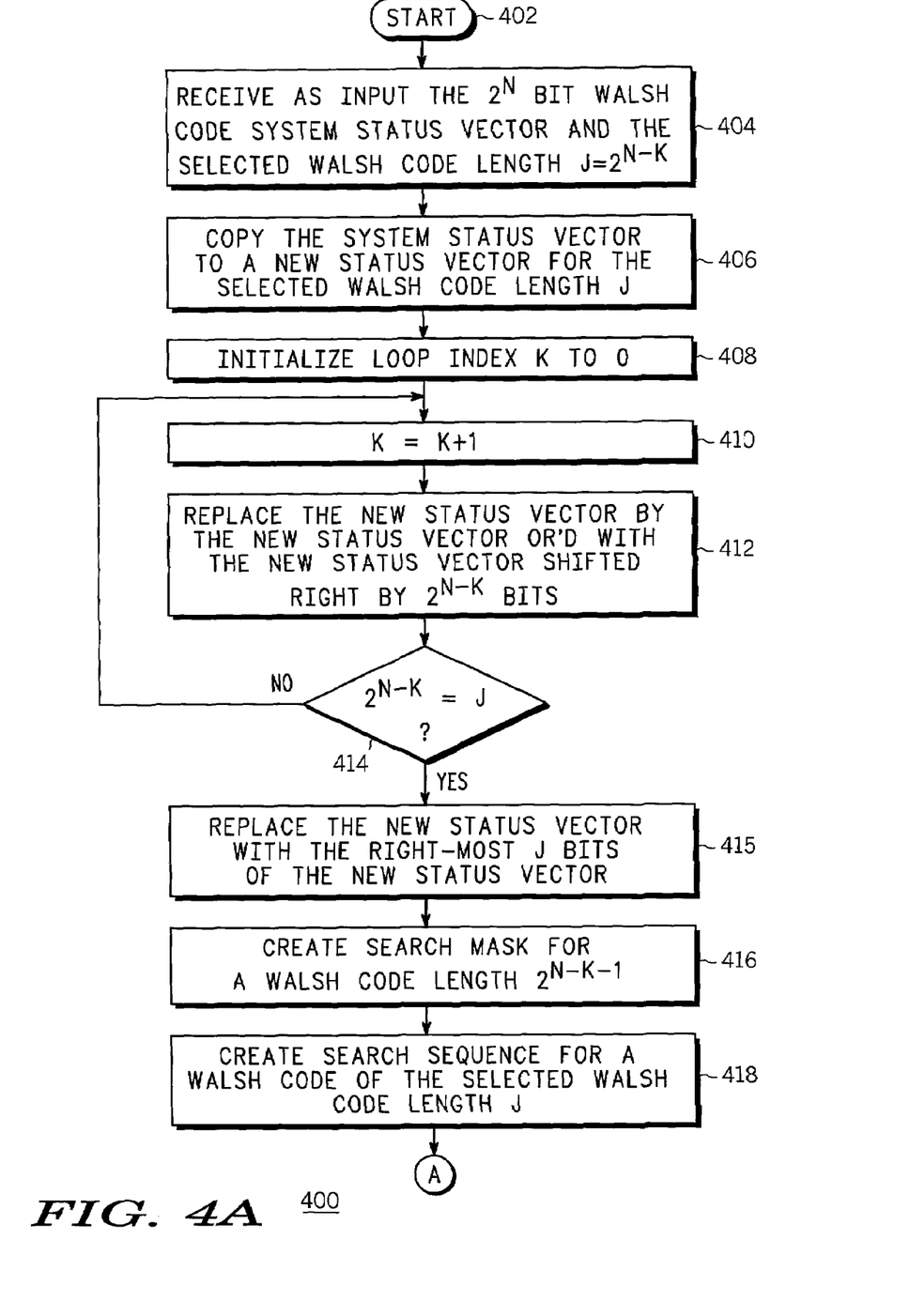
FIG. 4 is a flow chart for a method of selecting the next available Walsh code of a desired length in a Walsh code system according to another embodiment of the present invention.
Figure 4B:
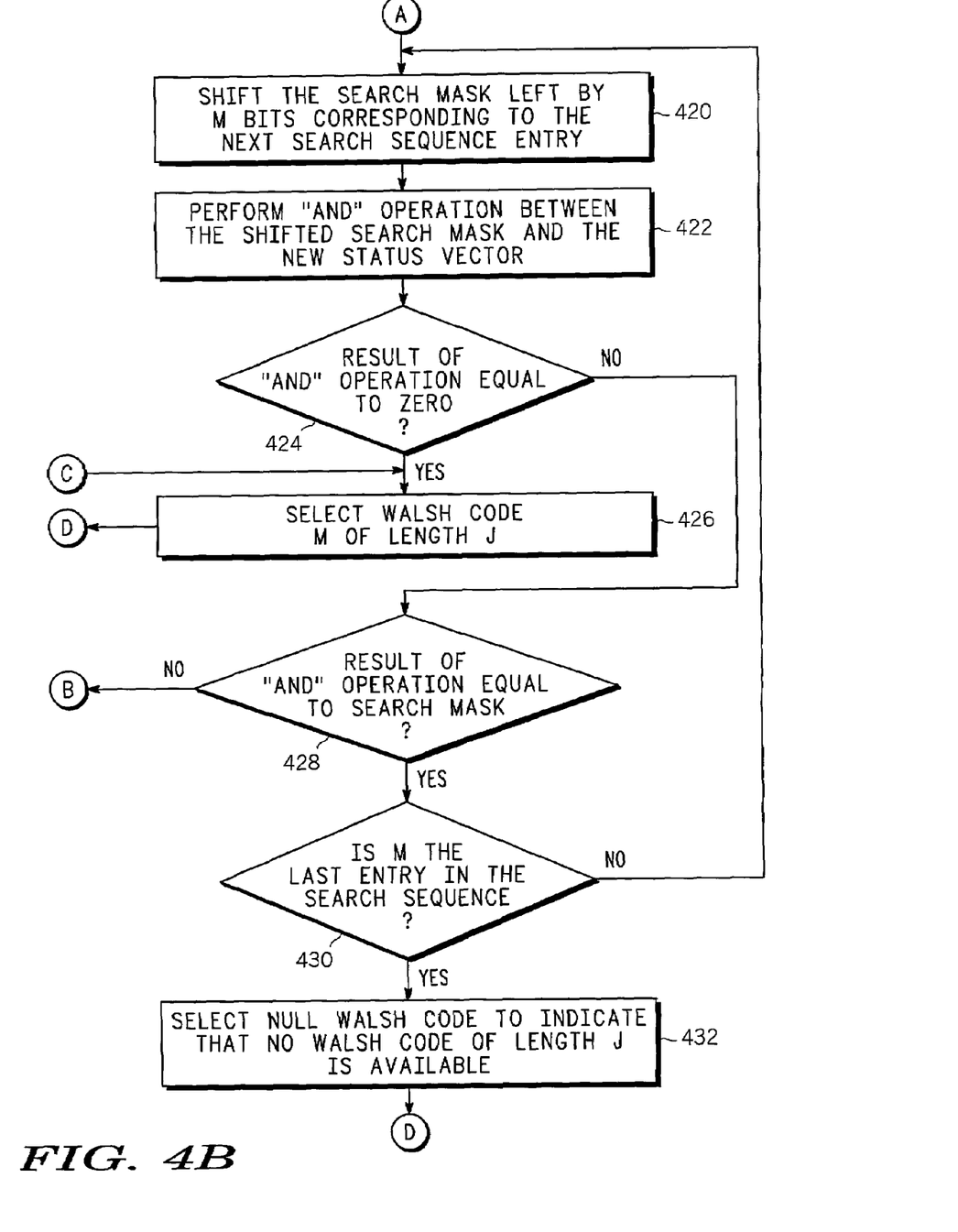
Figure 4C:
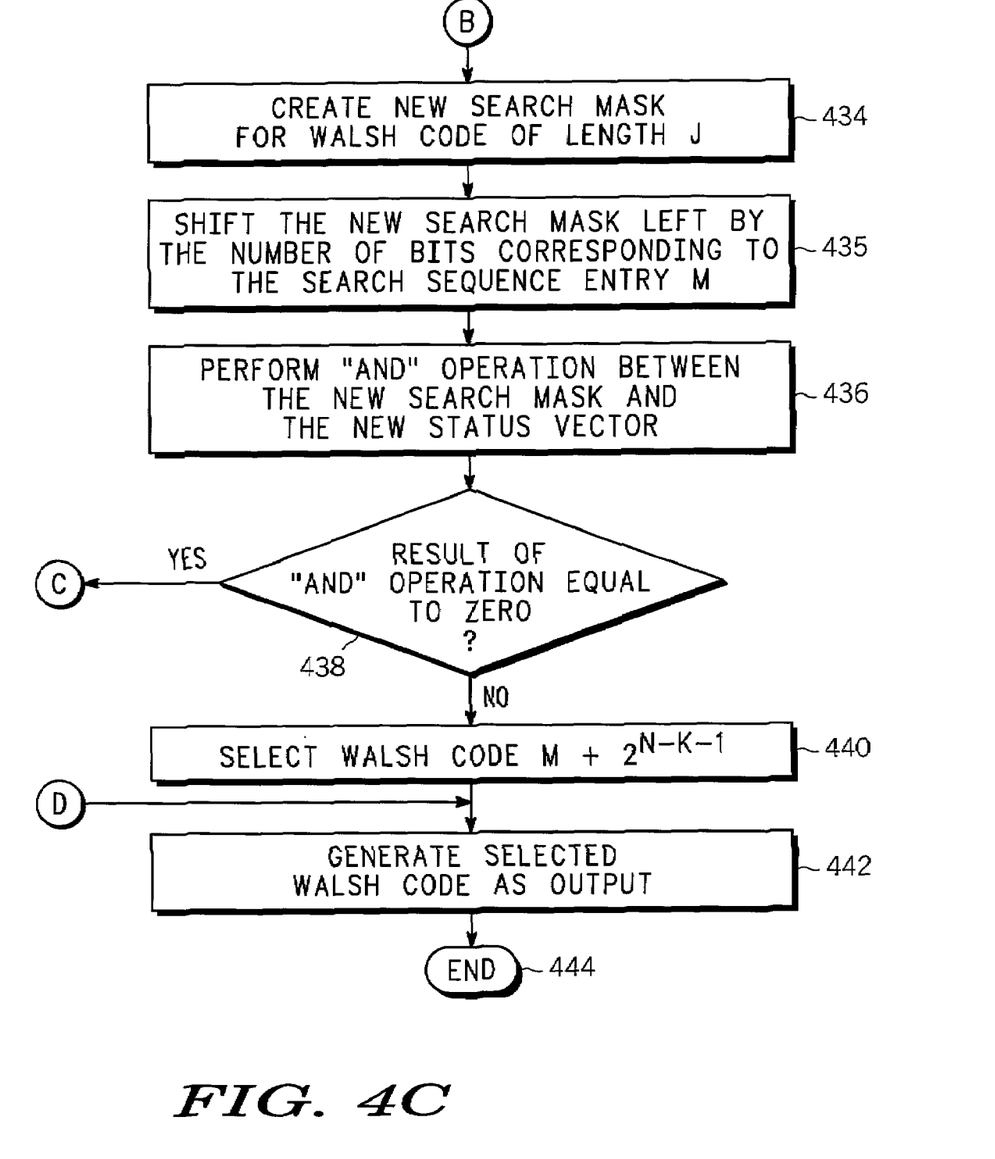

FIG. 4 is a flow chart 400 of a method for selecting the next available Walsh code M that may be used for any selected Walsh code length j in a Walsh code system of order n greater than or equal to $j=2^{(n-k)}$. The selected Walsh code length j must obey the Walsh code generation rules and is therefore equal to a power of 2, e.g., 1, 2, 4, 8, 16, 32, 64, etc.

Step 402 is the entry point for the flowchart 400.

In step 404, the $2^n$ bit Walsh code system status vector and the desired Walsh code length $j=2^{n-k}$ are received as input.

In step 406, the $2^n$ bit status vector is copied to a new status vector for the desired Walsh code length j.

In step 408, a Walsh code length loop index k is initialized to 0.

In step 410, the Walsh code length loop index k is incremented by 1.

In step 412, the new status vector is replaced by the new status vector OR'd with the new status vector shifted right by $2^{n-k}$ bits.

In step 414, if $2^{n-k}$ is not equal to the selected Walsh code length j, then control transfers back to step 410. If $2^{n-k}$ is equal to the selected Walsh code length j, then control transfers to step 415.

In step 415, the status vector is shortened to length j by replacing the status vector with the right-most j bits of the status vector.

In step 416, a search mask is created for a Walsh code of length $2^{n-k-1}$ as described above.

In step 418, a search sequence for the selected Walsh code length j is created as described above.

In step 420, the search mask is shifted left by the number of bits corresponding to the next search sequence entry M. For example, if the next Walsh code in the search sequence is 9, then the shifted search mask is equal to the search mask left shifted by 9 bits.

In step 422, the shifted search mask is bitwise AND'd with the new status vector.

In step 424, if the result of the AND operation in step 422 equals zero, then control transfers to step 426. If the result of the AND operation in step 422 does not equal zero, then control transfers to step 428.

In step 426, the Walsh code M of length j is selected and control transfers to step 442.

In step 428, if the result of the AND operation in step 422 equals the search mask, then control transfers to step 430. If the result of the AND operation in step 422 does not equal the search mask, then control transfers to step 434.

In step 430, if M is not the last entry in the search sequence, then control transfers back to step 420. If M is the last entry in the search sequence, then control transfers to step 432.

In step 432, a null Walsh code is selected to indicate that no Walsh codes of the selected length j are available, and control transfers to step 442.

In step 434, a new search mask is created for a Walsh code of length j as described above.

In step 435, the new search mask is shifted left by the number of bits corresponding to the search entry M.

In step 436, the new search mask is bitwise AND'd with the new status vector.

In step 438, if the result of the AND operation in step 436 equals zero, then control transfers to step 426. If the result of the AND operation in step 436 does not equal zero, then control transfers to step 440.

In step 440, the Walsh code $M+2^{n-k-1}$ of length j is selected.

In step 442, the selected Walsh code is generated as output.

Step 444 is the exit point for the flow chart 400.

The status vector may be used not only for searching for available Walsh codes as explained above, but also for tracking the assignment status of each Walsh code in the Walsh code system. The status vector may be updated to track the assignment and release of each Walsh code of each Walsh code length in the Walsh code system as follows.

Figure 5:
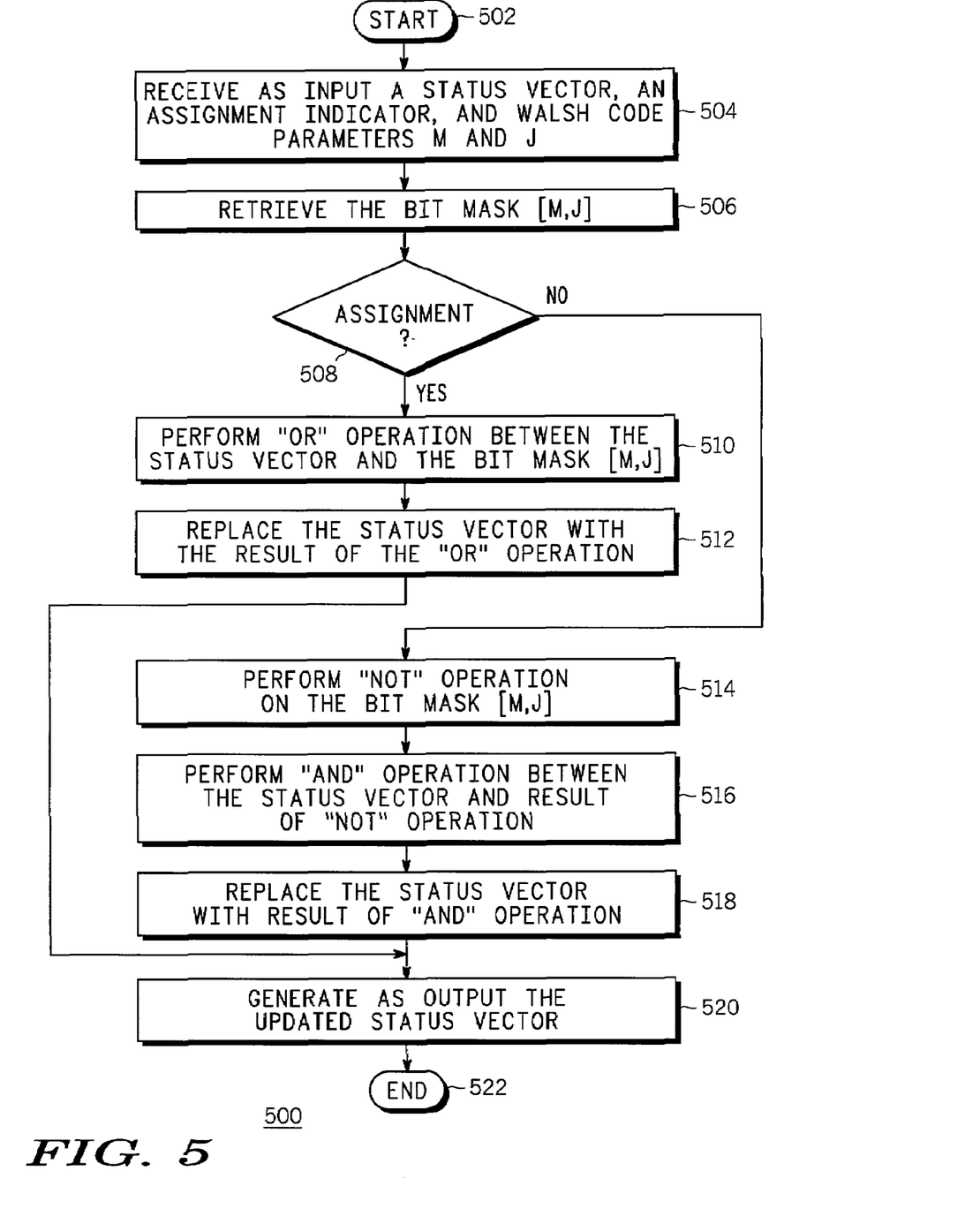
FIG. 5 is a flowchart for tracking the assignment and release of every Walsh code in a Walsh code system.

FIG. 5 is a flowchart 500 for tracking the assignment of Walsh codes as they are assigned for a specific use and later released to become available for other use.

Step 502 is the entry point for the flowchart 500.

In step 504, a status vector, an assignment indicator, a Walsh code parameter M, and a Walsh code length parameter j are received as input. The selected Walsh code length j must obey the Walsh code generation rules and must therefore be equal to a power of 2, e.g., 1, 2, 4, 8, 16, 32, 64, etc. The assignment indicator indicates whether the Walsh code M of length j is to be assigned or released.

In step 506, the bit mask [M,j] for the Walsh code M of length j is retrieved from a lookup table.

In step 508, the assignment indicator is checked to determine whether an assignment is indicated.

In step 510, if the assignment indicator indicates an assignment, a bitwise OR operation is performed between the status vector and the bit mask [M,j].

In step 512, the status vector is replaced with the result of the OR operation in step 510 and control transfers to step 520. The covered Walsh codes resulting from the assignment of the j-bit Walsh code M are now set to "1" in the updated status vector.

In step 514, if the assignment indicator indicates a release, a bitwise inverse or negation operation on the bit mask [M,j] is performed.

In step 516, a bitwise AND operation between the status vector and result of the negation operation of the bit mask [M,j] in step 514 is performed.

In step 518, the status vector is replaced with the result of the AND operation between the status vector and the bit mask [M,j] in step 516. The uncovered Walsh codes resulting from the release of the j-bit Walsh code M are now set to "0" in the updated status vector.

In step 520, the updated status vector is generated as output.

Step 522 is the exit point for the flow chart 500.

While the coverage sequence table 100 and the status vector 200 used in this example for a 16-bit Walsh code system is used to facilitate an understanding of the search method illustrated in FIG. 4, a typical Walsh code system may have, for example, 256 Walsh codes. The same methods described above for generating the Walsh code coverage sequence table, the status vector, and the bit masks and for searching the status vector may be used for a 256-bit Walsh code system or any other desired n-bit Walsh code system.

The methods explained above may also be embodied in a computer program product that includes a medium for embodying a computer program for input to a computer and a computer program embodied in the medium for causing the computer to perform the following functions: receiving as input a status vector for a Walsh code system of length $2^n$; creating a new status vector for a selected Walsh code length of $j=2^{n-k}$ from the status vector; creating a search mask for the selected Walsh code length of j; creating a search sequence for the selected Walsh code length of j; and searching the search sequence with the search mask to find the next available Walsh code.

Other modifications, variations, and arrangements of the present invention may be made in accordance with the above teachings other than as specifically described to practice the invention within the spirit and scope of the following claims.

What is claimed is:

1. A method of assigning Walsh codes comprising the steps of:
   (a) receiving as input a status vector for a Walsh code system of length $2^n$;
   (b) creating a new status vector for a selected Walsh code length of $j=2^{n-k}$ from the status vector;
   (c) creating a search mask for the selected Walsh code length of j;
   (d) creating a search sequence for the selected Walsh code length of j; and
   (e) searching the search sequence with the search mask to find the next available Walsh code;
   wherein step (b) comprises the steps of:
   (b1) copying the status vector to a new status vector for the desired Walsh code length j;
   (b2) initializing a loop index k to zero;
   (b3) incrementing the loop index k by one;
   (b4) replacing the new status vector with the new status vector OR'd with the new status vector shifted right by $2^{n-k}$ bits; and
   (b5) repeating steps (b3) and (b4) until $2^{n-k}$ equals the desired Walsh code length j.

2. The method of claim 1 wherein step (e) comprises the steps of:
   (e1) shifting the search mask left by a number of bits corresponding to a next search sequence entry M to generate a shifted search mask;
   (e2) perforating an AND operation between the shifted search mask and the new status vector; and
   (e3) generating as output a Walsh code M of length j if the result of step (e2) equals zero.

3. The method of claim 2 further comprising the steps of:
   (e4) returning to step (e1) if the search sequence entry M is not last in the search sequence and if the result of step (e2) equals the search mask; and
   (e5) generating as output a null Walsh code indicating that no Walsh code is available at the selected length j if M is last in the search sequence.

4. The method of claim 3 further comprising the steps of:
   (e6) creating a new search mask for a Walsh code of the selected length j if the result of step (e2) does not equal the search mask;
   (e7) shifting the new search mask left by a number of bits corresponding to the search sequence entry M to generate a shifted search vector;
   (e8) performing an AND operation between the shifted search vector and the new status vector; and
   (e9) generating as output a Walsh code M of length j if the result of step (e8) equals zero.

5. The method of claim 4 further comprising the step of (e10) generating as output a Walsh code $M+2^{n-k}$ of length j if the result of step (e8) does not equal zero.

6. A method of tracking an assignment status of Walsh code in a Walsh code system comprising the steps of:
   (a) receiving as input a status vector, an assignment indicator, a Walsh code parameter M, and a Walsh code length parameter j wherein M and j are positive integers;
   (b) retrieving a bit mask [M,j]; and
   (c) updating the status vector as a function of the Walsh code parameter M, the assignment indicator, and the bit mask [M,j];
   wherein step (c) comprises the following steps:
   (c1) checking whether the assignment indicator indicates an assignment or a release of Walsh code M of length j;
   (c2) performing an OR operation between the status vector and the bit mask [M,j] if the assignment indicator indicates an assignment; and
   (c3) replacing the status vector with a result of the OR operation between the status vector and the bit mask [M,j] to set covered Walsh codes in the status vector.

7. The method of claim 6 wherein step (c) comprises the following steps:
   (c4) performing a negation operation on the bit mask [M,j] if the assignment indicator indicates a release;
   (c5) performing an AND operation between the status vector and the result of the negation operation; and
   (c6) replacing the status vector with a result of the AND operation between the status vector and the result of the negation operation to clear uncovered Walsh codes in the status vector.

8. A computer program system comprising:
   a computer readable medium for input of a program to a computer; and
   a computer executable program embodied in the computer readable medium for causing the computer to perform the following functions:
   (a) receiving as input a status vector for a Walsh code system of length $2^n$;
   (b) creating a new status vector for a selected Walsh code length of $j=2^{n-k}$ from the status vector;
   (c) creating a search mask for the selected Walsh code length of j;
   (d) creating a search sequence for the selected Walsh code length of j; and
   (e) searching the search sequence with the search mask to find an available Walsh code;
   wherein step (b) comprises the steps of:
   (b1) copying the status vector to a new status vector for the desired Walsh code length j;
   (b2) initializing a loop index k to zero;
   (b3) incrementing the loop index k by one;
   (b4) replacing the new status vector with the new status vector OR'd with the new status vector shifted right by $2^{n-k}$ bits; and
   (b5) repeating steps (b3) and (b4) until $2^{n-k}$ equals the desired Walsh code length j.

9. The computer program product of claim 8 wherein step (e) comprises the steps of:
- (e1) shifting the search mask left by a number of bits corresponding to a next search sequence entry M to generate a shifted search mask;
- (e2) performing an AND operation between the shifted search mask and the new status vector; and
- (e3) generating as output a Walsh code M of length j if the result of step (e2) equals zero.

10. The computer program product of claim 9 further comprising the steps of:
- (e4) returning to step (e1) if the search sequence entry M is not last in the search sequence and if the result of step (e2) equals the search mask; and
- (e5) generating as output a null Walsh code indicating that no Walsh code is available at the selected length j if the search sequence entry M is last in the search sequence.

11. The computer program product of claim 10 further comprising the steps of:
- (e6) creating a new search mask for a Walsh code of the selected length j if the result of step (e2) does not equal the search mask;
- (e7) shifting the new search mask left by a number of bits corresponding to the search sequence entry M to generate a shifted search vector;
- (e8) performing an AND operation between the shifted search vector and the new status vector; and
- (e9) generating as output a Walsh code M of length j if the result of step (e8) equals zero.

12. The computer program product of claim 11 further comprising the step of (e10) generating as output a Walsh code $M+2^{n-k}$ of length j if the result of step (e8) does not equal zero.

13. The computer program system comprising:
a computer readable medium for input of an executable program to a computer; and
a computer executable program embodied in the computer readable medium for causing the computer to perform the following functions:
- (a) receiving as input a status vector, an assignment indicator, a Walsh code parameter M, and a Walsh code length parameter j wherein M and j are positive integers;
- (b) retrieving a bit mask [M,j]; and
- (c) updating the status vector as a function of the Walsh code parameter M, the assignment indicator, and the bit mask [M,j];

wherein step (c) comprises the following steps:
- (c1) checking whether the assignment indicator indicates an assignment or a release of Walsh code M of length j;
- (c2) performing an OR operation between the status vector and the bit mask [M,j] if the assignment indicator indicates an assignment; and
- (c3) replacing the status vector with a result of the OR operation between the status vector and the bit mask [M,j] to set covered Walsh codes in the status vector.

14. The computer program product of claim 13 wherein step (c) comprises the following steps:
- (c4) performing a negation operation on the bit mask [M,j] if the assignment indicator indicates a release;
- (c5) performing an AND operation between the status vector and the result of the negation operation; and
- (c6) replacing the status vector with a result of the AND operation between the status vector and the result of the negation operation to clear uncovered Walsh codes in the status vector.

* * * * *